(12) United States Patent
Wasser et al.

(10) Patent No.: US 7,043,874 B2
(45) Date of Patent: May 16, 2006

(54) **SUBSTRATE AND METHOD FOR GROWING SHIITAKE MUSHROOMS [*LENTINUS EDODES* (BERK.) SINGER] AND NEW SHIITAKE STRAIN**

(75) Inventors: Solomon P. Wasser, Nesher (IL); Viktor T. Bilay, Kiev (UA)

(73) Assignee: Carmel-Haifa University Economic Corp. Ltd., Haifa (IL)

( * ) Notice: Subject to any disclaimer, the term of this patent is extended or adjusted under 35 U.S.C. 154(b) by 134 days.

(21) Appl. No.: 10/705,196

(22) Filed: Nov. 12, 2003

(65) Prior Publication Data

US 2005/0097815 A1 May 12, 2005

(51) Int. Cl.
*A01G 1/04* (2006.01)

(52) U.S. Cl. .................................. 47/1.1; 71/5; 554/8
(58) Field of Classification Search ............ 554/8; 47/1.1; 71/5
See application file for complete search history.

(56) References Cited

U.S. PATENT DOCUMENTS

| | | | |
|---|---|---|---|
| 1,833,089 A | 11/1931 | Morimoto | |
| 3,942,969 A | * 3/1976 | Carroll, Jr. et al. | ............... 71/5 |
| 4,127,965 A | 12/1978 | Mee | |
| 4,637,163 A | 1/1987 | Pellinen et al. | |
| 4,646,466 A | 3/1987 | Olah | |
| 4,874,419 A | 10/1989 | Wu | |
| 5,574,093 A | 11/1996 | States, Sr. et al. | |

FOREIGN PATENT DOCUMENTS

| | | | |
|---|---|---|---|
| EP | 1 035 091 A1 | | 9/2000 |
| ES | 2007071 A | * | 6/1989 |
| HU | 209034 A | * | 3/1994 |
| JP | 63273415 A | * | 11/1988 |
| WO | WO 00/15583 A1 | | 3/2000 |

OTHER PUBLICATIONS

Zervakis et al. 1996. Bioremediation of Olive Oil Mill Wastes Through the Production of Fungal biomass. Penn State University.*
Vinciguerra et al. 1995. Correlated effects during the bioconversion of waste olive oil by *Lentinus edodes*. Bioresource Technology 51: 221–226.*
Pompei et al.. Jun. 1994. The use of olive milling waste for the culture of mushrooms on perlite. Acta horticulture 361, pp. 179–185. (title only).*

* cited by examiner

*Primary Examiner*—Jeffrey L. Gellner
(74) *Attorney, Agent, or Firm*—Browdy and Neimark, P.L.L.C.

(57) ABSTRACT

The present invention describes a new substrate comprising olive oil waste as the nutrient for growing edible and medicinal shiitake mushrooms (*Lentinus edodes*) in aseptic plastic bags. The invention further provides the strain Ile-1, a new and distinct variety of the species *Lentinus edodes*, that grows very efficiently in the olive oil waste-containing substrate.

4 Claims, 9 Drawing Sheets

SUBSTRATE AND METHOD FOR GROWING SHIITAKE MUSHROOMS [*LENTINUS EDODES* (BERK.) SINGER] AND NEW SHIITAKE STRAIN

FIELD OF THE INVENTION

The present invention relates to edible mushrooms, more particularly to shiitake mushrooms (*Lentinus edodes* (Berk.) Singer), and to new substrates and methods for growing shiitake mushrooms. The invention further relates to a new and distinct strain of shiitake that is suitable for growth in the new substrate of the invention.

BACKGROUND OF THE INVENTION

Mushrooms or macrofungi with distinctive fruiting bodies of sufficient size that can be seen with the naked eye include about 12,000 species of varying degrees of edibility. Approximately 100 species have been tested for cultivation and only 11 to 13 have been cultivated on an industrial scale. The world production of cultivated edible mushrooms in 2002 was estimated to be about 9 million tons and was valued at about ten billion US dollars. The most popular species of cultivated edible mushrooms include *Agaricus bisporus* (J. Lge) Imbach, *Lentinus edodes, Pleurotus* spp., *Auricularia* spp., *Volvariella volvacea* (Fr.) Singer, *Flammulina velutipes* (Fr.) Singer, *Tremella fuciformis* Berk., *Hypsizygus marmoreus* (Peck) Bigel., *Pholiota nameko* (T. Ito) S. Ito et Imai, *Grifola frondosa* (Dicks.: Fr.) S. F. Gray, *Hericium erinaceus* (Bull.: Fr.) Pers., *Dictyophora indusiata* (Vent.: Pers.) Fischer, *Stropharia rugosoannulata* Far. apud Murr., *Lepista nuda* (Bull.: Fr.) Cooke, and *Agrocybe aegerita* (Brig.) Sing.

Many mushrooms are now cultivated intensively as opposed to being allowed to grow under reasonably wild conditions.

The cultivation of fruiting bodies of mushrooms deals with living organisms, for example, the mushroom itself and other microorganisms, which may either be harmful or beneficial. Therefore, the methods employed in mushroom cultivation require modifications depending upon the region being cultivated, substrates available, environmental conditions, and species of microorganisms encountered. The cultivation of mushrooms for fruiting body production is a long-term process needing from one to several months for the first fruiting bodies to appear.

The shiitake mushroom [scientific name: *Lentinus edodes* (Berk.) Singer] is a scented, edible mushroom grown in Asia, largely in Japan, China, and South Korea. It can grow successfully on a wide variety of hardwood tree species. The common name 'shiitake' is derived from the Japanese word for the hardwood host tree 'shii' and mushroom—'take'. In China it is called the 'hsaing ku' or fragrant mushroom and elsewhere is also known as the Black Forest Mushroom. The shiitake is currently the second most widely cultivated mushroom in the world, serving as both an edible mushroom and more recently for medicinal and health purposes.

Shiitake mushrooms grow on a lignocellulose base as opposed to coprophilous mushrooms, for example, the bottom mushroom (*Agaricus bisporus*), which grow by decomposing dung or compost. It is very difficult to grow the shiitake mushroom because it grows only on wood, whereas the other mushrooms will grow on almost any sort of cellulose base such as straw or cotton waste. The shiitake mushroom apparently requires lignin as well as cellulose as a base for growth.

In nature, the shiitake fungus propagates and spreads from spores produced by the mushroom. However, for cultivation, spore germination is too unreliable. Instead, logs are inoculated with actively growing fungi. The fungus is first adapted to wood by growing it directly on small pieces of wood. Active fungal cultures, intended as inoculum for mushroom cultivation, are called spawn. Because the quality of the crop can be no better than the spawn, growers must use viable shiitake spawn of a good variety in pure culture, free of weed fungi and bacteria.

Currently, in Japan, the cultivation of shiitake mushrooms is achieved through growing the mycelia of the shiitake spawn on wood fiber chips rather than on logs. The chips are soaked through a distilled water process, and the mushroom beds are sterilized by steam before being inoculated with shiitake spawn. Due to the sensitive nature of the spawn, no pesticides, fungicides or chemicals are added, as they would destroy the mycelium or severely retard its development.

U.S. Pat. No. 1,833,089 discloses a method for culturing mushrooms of various kinds consisting of culturing spawns of mushrooms with a culture media prepared from sawdust and brans, which are kneaded together with water. Said media is heat-sterilized and cooled before the addition of the spawn.

U.S. Pat. No. 4,127,965 discloses a method for cultivating shiitake and other tree mushrooms on a substrate comprised of cellulosic material, preferably in tree log form, and nutrients. In this method, the substrate comprises at least 60% of a cellulosic material, e.g., sawdust obtained from hardwood species, and nutrients consisting of 5–15% starch and 1–15% proteinaceous waste materials. The substrate is introduced into a flexible container, which is sealed and sterilized. After cooling, the substrate is inoculated with the appropriate spawn. The container is sealed against particulate matter, but not against air, and the substrate incubated at moderately elevated temperatures while being molded into a desired form (e.g., log or stump) in the container and is then removed from the container and cured, as required, at moderately reduced temperatures.

U.S. Pat. No. 4,637,163 discloses a method of producing wood-rotting edible mushrooms *Lentinus edodes, Kuehneromyces mutabilis, Pholiota* spp. and *Pleurotus* spp. utilizing a bed material mixed from a carbohydrate, lignin and protein-containing compound material and minor amount of peat.

U.S. Pat. No. 4,646,466 describes a substrate for the cultivation of *Basidiomycetes Agaricales* mushrooms, particularly the gourmet Quebec *Pleurotus* Super Mushroom, comprised of straw, wood chips from broad-leaved trees, crushed shelled ears of corn, vermiculite, Japanese millet, mixed cereal grains, lime, and micro-cell.

U.S. Pat. No. 4,874,419 describes a non-sterile, pasteurized substrate composition suitable for growing shiitake mushrooms consisting of a nitrogen-containing compost mixture consisting essentially of a vegetative waste, a mineral fertilizer and water, said mixture having a moisture content of about 65% to 80%. The vegetative waste consists essentially of cellulosic and lignin-containing materials such as wheat straw, cottonseed meal, corncobs, and mixtures thereof, and the mineral fertilizer comprises potash, gypsum, and ammonium nitrate as sources of potassium, calcium, and nitrogen, respectively.

Cultivation of shiitake has remained in a primitive state until very recently. Traditionally, shiitake mushrooms have been grown on tree trunks with some types of trees supporting more abundant growth than others. Growth of shiitake on trees typically requires between one and two years until the first crop of fruiting bodies is produced.

It would be very desirable to provide methods for commercial production of shiitake mushrooms of good quality in a relatively short time.

SUMMARY OF THE INVENTION

It has now been found, in accordance with the present invention, that the addition of olive oil waste to a substrate for growing shiitake can expedite the cultivation of the mushroom leading to shiitake mushrooms of good quality in a relatively short time.

The present invention thus provides, in one aspect, a substrate for growing shiitake mushrooms comprised of olive oil waste as the nutrient.

In one embodiment, the substrate of the invention comprises a vegetative waste and a nutrient, wherein said nutrient is olive oil waste.

In another embodiment, the substrate of the invention comprises a vegetative waste, olive oil waste as a nutrient, and a mineral fertilizer.

In another aspect, the present invention provides a method for short-time commercial production of shiitake mushrooms which comprises growing the mushrooms aseptically in plastic bags on a sterilized substrate containing olive oil waste as the nutrient. This method was found to expedite the growth of shiitake mushrooms, allowing harvest in as little as about 2.5 months after inoculation.

The present invention further provides a new and distinct strain of shiitake mushroom, the species *Lentinus edodes* (Berk.) Singer, herein identified as the strain Ile-1, that has been deposited as culture with the Centraalbureau voor Schimmelcultures (CBS), Uppsalalaan 8, P.O. Box 85167, 3508 AD Utrecht, The Netherlands, on Mar. 4, 2003, under the Budapest Treaty for Patent Purposes, and was assigned the No. CBS 112269. The shiitake strain Ile-1 is particularly suitable for growing in the substrate of the invention comprised of olive oil waste.

BRIEF DESCRIPTION OF THE FIGURES

FIG. 7A: sterilized grain immediately after inoculation by grain spawn G-2 (grain is placed in the part of the bag without filters); FIGS. 7B, 7C: grain after shaking and different stages of shiitake mushrooms grown in bags (grain is placed in the part of the bag with filters); FIG. 7D: third generation grain spawn G-3 ready to use.

DETAILED DESCRIPTION OF THE INVENTION

Figure 1:
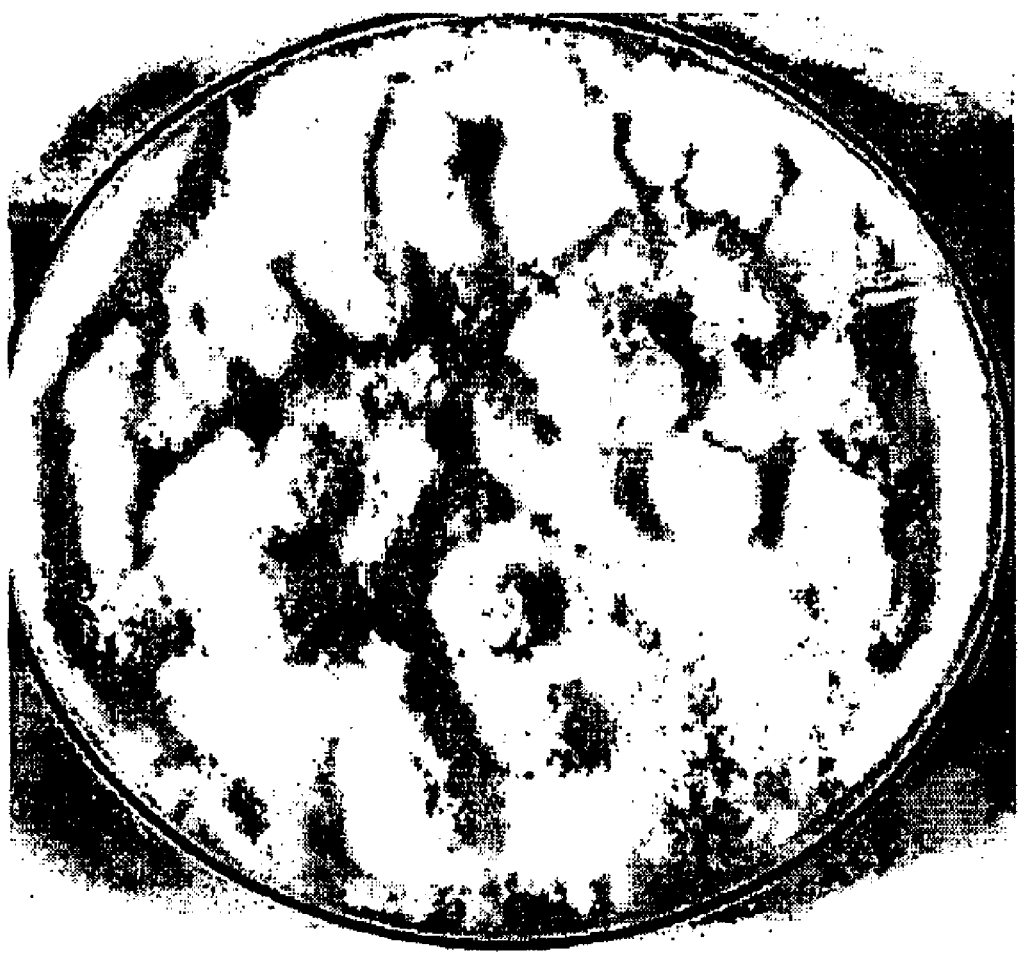
FIG. 1 shows a general view of a 3-week old shiitake colony of strain Ile-1 on a Petri dish in an agar medium.

According to the present invention, shiitake mushrooms can grow in a relatively short time on a substrate comprised of olive (*Olea europea* L.) oil waste as the nutrient.

The substrate of the invention comprises, as a base component, a vegetative waste material that consists essentially of cellulosic and lignin-containing materials necessary for shiitake growth. Materials can be chosen from those used in traditional substrates such as, but not limited to, cereal straw, preferably wheat straw, sawdust (pine), grass hay, alfafa hay, cottonseed meal, corncobs, and mixtures thereof. However, the invention envisages to also encompass other suitable vegetative waste materials such as peanut, almond, sunflower shells, banana leaves, and grape residues that may be identified in the future as suitable for the purpose of the invention. In one preferred embodiment, the cellulosic material is wheat (genus *Triticum* L.) straw.

The nutrient additive according to the invention is olive oil waste, preferably the solid olive cake by-product from "cold-pressed" olive oil production.

The substrate may further contain a mineral fertilizer that may be chosen from known minerals used in traditional substrates as sources of calcium, sulfur. nitrogen, phosphor, and potassium such as gypsum, ammonium nitrate, potash, and other minerals that may be identified in the future as suitable. In one preferred embodiment, the mineral supplement is gypsum.

A broad range of component ratios can be used when preparing the nontraditional substrate of the invention for growing shiitake mushrooms. The vegetative waste component, preferably wheat straw, is the major component. Unless otherwise indicated, all percentages reported throughout the specification and claims are by weight.

In one preferred embodiment of the invention, the substrate mixture comprises about 50–80%, preferably 50–70%, more preferably 50–60%, of wheat straw on a dry weight basis and about 20–50%, preferably about 30–50%, more preferably about 30–40% by weight of olive oil waste, and gypsum at an amount of about 2–10%, preferably about 5–10% by weight. In a most preferred embodiment of the invention, the substrate comprises about 2 parts of wheat straw, 1 part or less of olive oil waste and 5–10% of gypsum.

For preparation of the substrate of the invention in one embodiment, the vegetative waste material (the olive oil waste) and the mineral fertilizer (if present) are blended together to form a substrate mixture, which is chopped and wetted by the addition of water to a moisture content between 60 and 75% (preferably 65–70%). In another embodiment, the olive oil waste is soaked for at least one hour and mixed with gypsum, and the mixture is added to wheat straw that has been soaked for 12–24 hours, and mixed again upon checking the pH (the pH of the mixture should be 5.0–6.0) and humidity.

The substrate is then immediately used to fill high-pressure resistant plastic, e.g., polypropylene bags with bactericide filters, in order to be sterilized. This will provide clean material for the mushrooms to grow on. The substrate is placed in the part of the bag without filters. After filling, the ends of the bags are sealed and the substrate mixture is sterilized by autoclaving at a temperature of 121° C. for 30–40 minutes. The time between mixing the substrate and sterilization should be less than six hours. The method and conditions of sterilization will depend upon the likely contamination of the initial substrates and the spore content of the surrounding environment.

For the inoculation step, the sterilized substrate is cooled slowly to an ambient temperature, generally between 23° C. to 28° C., preferably about 25° C. to 27° C. The bags are opened under sterile conditions and the shiitake mushroom spawn is mixed into the sterile substrate in the bags. Grain shiitake spawn consisting of mycelia and their growth substrate of rye, wheat, barley, or the like is preferred as a form of shiitake mushroom spawn, but also the use of sawdust spawn obtained by inoculation of sawdust with grain spawn is contemplated by the invention. The spawn is added to the substrate at about 2 to 10%, preferably 5%, by dry weight. After filling, the ends of the bags are sealed again and shaken. After shaking, the substrate is moved to the part of the bags with filters.

For spawn run, the sealed inoculated bags are left at room temperature to allow the substrate to be fully colonized by the spawn before fruiting. The optimal conditions for the shiitake mushroom spawn run are with internal temperature of 25–27° C. and humidity of 65–70%. No light is required during the spawn run. The spawn run may take from 4–12 weeks, preferably 6–8 weeks, to enable the spawn to penetrate and spread fully throughout the mass of the substrate.

To promote fruiting, the cropping conditions are changed. After 6–8 weeks of spawn run, the plastic bags are opened and removed from the formed blocks. The blocks are placed horizontally or vertically on shelves in a growth chamber and the air temperature is lowered to about 12–20° C., preferably 16–18° C. The humidity is raised to about 90% and light is introduced. The blocks are exposed to normal cropping conditions of light and temperature. Thus, the blocks are incubated with 12-hour light and 12-hour dark cycles, with fresh air exchanges. Light can be provided by fluorescent tubes delivering between about 800 and, preferably, 1000 lux.

As is known for many mushroom species and strains, fruiting of the mushrooms can be stimulated by subjecting the mycelia to a "cold shock" treatment. However, one of the advantages of the selected shiitake mushroom strain "Ile-1" is that for fruiting to take place, "cold shock" treatment is not necessary.

After 5–7 days in the growth chamber, buds appear and within a further 5–7 days the first flush of shiitake mushrooms are ready for cropping.

Using the described methodologies, a first harvest of shiitake mushrooms can be obtained within about 2.5 months. In subsequent breaks, mature mushrooms can be harvested every 10 to 14 days, approximately. The cycle may be carried out up to 4 times before the cellulose and lignin from the nontraditional substrate are exhausted, making it incapable of supporting further cropping.

The shiitake mushrooms obtained by the method of the invention can be used as such or in dried form as edible products. The mushroom imparts a pleasantly spicy taste in food. According to many scientific studies in Japanese clinics, the mushroom has a three-fold healing and protective effect: antiviral, antithrombotic and cytotoxic. This means that it reduces cholesterol, prevents formation of thromboses by clumping of blood platelets, and suppresses virus infections. In addition, in many studies on humans the mushroom has inhibited and suppressed cancer cell growth. One of its constituents, lentinan, is a polysaccharide, (1,3)-beta-D-glucan, which has two branch points per 5 glucose molecules and has a molecular weight of roughly 1 million. Lentinan is antibacterial and stimulates the nonspecific immune system. In Japan, lentinan is used together with chemotherapy to treat tumors. It improves the function of macrophages and T-lymphocytes. In particular, lentinan stimulates the formation of interleukin-1, a tumor-killing substance, and increases the cell-killing action of the macrophages. According to more recent research, lentinan is said to prevent the formation of metastases in lung cancer.

In addition, the shiitake mushrooms contain other components that have been shown to have many healthy and medicinal benefits such as eritadenine, essential amino acids, zinc, enzymes such as trypsin and pepsin, and chitin. Thus, the shiitake mushrooms or their extracts are used as non-conventional medicines for lowering blood pressure and cholesterol levels and as anti-cancer, antiviral, and liver-protecting agents.

The invention will now be illustrated by the following non-limiting examples.

EXAMPLE 1

Preparation of Cultures of *L. Edodes* for Inoculation

*Lentinus edodes* strains Ile-1 (CBS112269) and Ile-2 and other strains of shiitake mushrooms were taken from the Culture Collection of Higher Basidiomycetes in the International Center for Cryptogamic Plants and Fungi, Institute of Evolution, University of Haifa, Israel. Cultures are maintained in tubes on agar media at 4° C.

Figure 2:
FIG. 2 shows structure of branching hyphae of shiitake strain Ile-1 mycelium.
Figure 3:
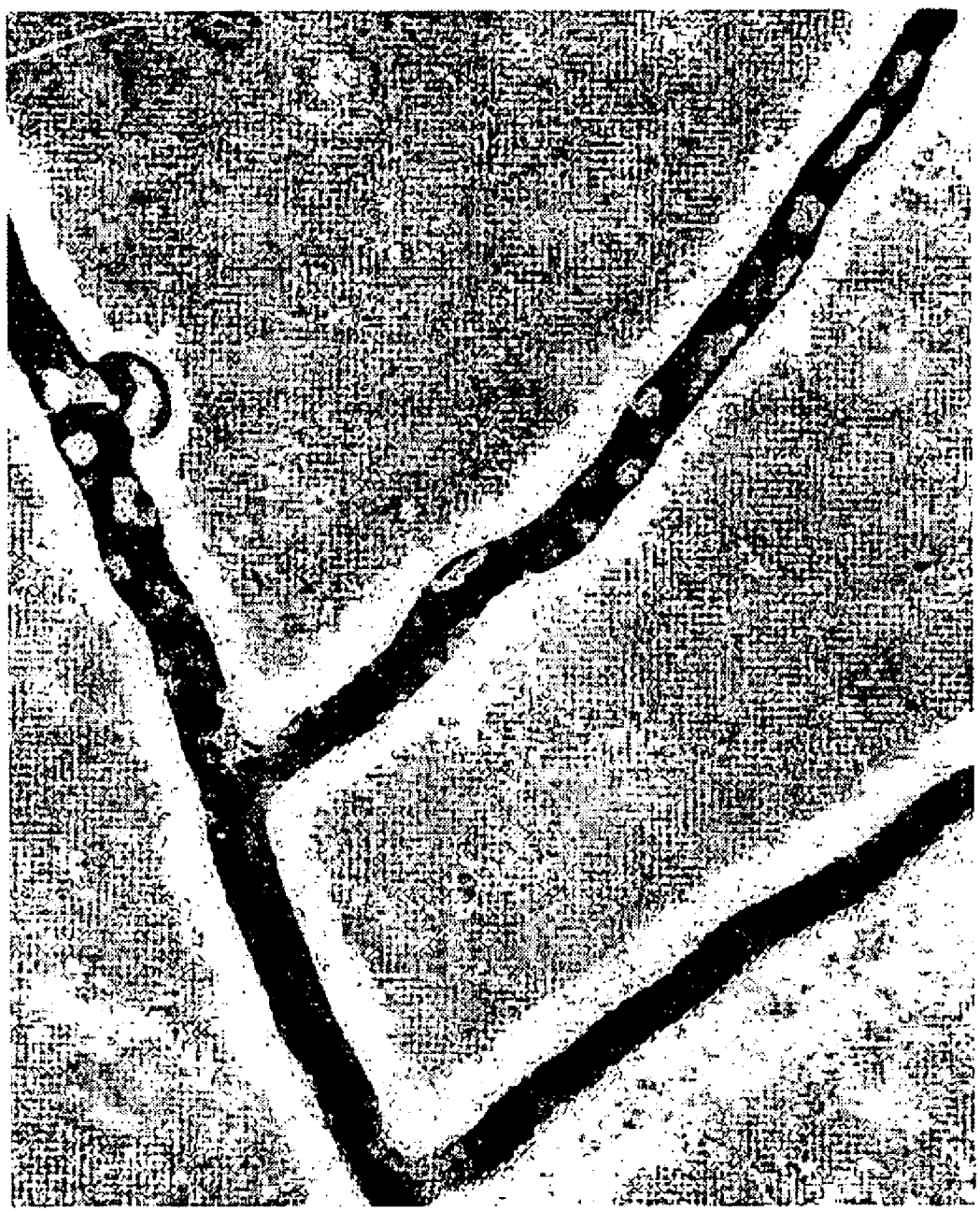
FIG. 3 shows branching hyphae of shiitake strain Ile-1 mycelium with clamp connection. Living (not fixed) mycelium (light vacuoles and dark protoplasm) (phase contrast microscope).
Figure 4:
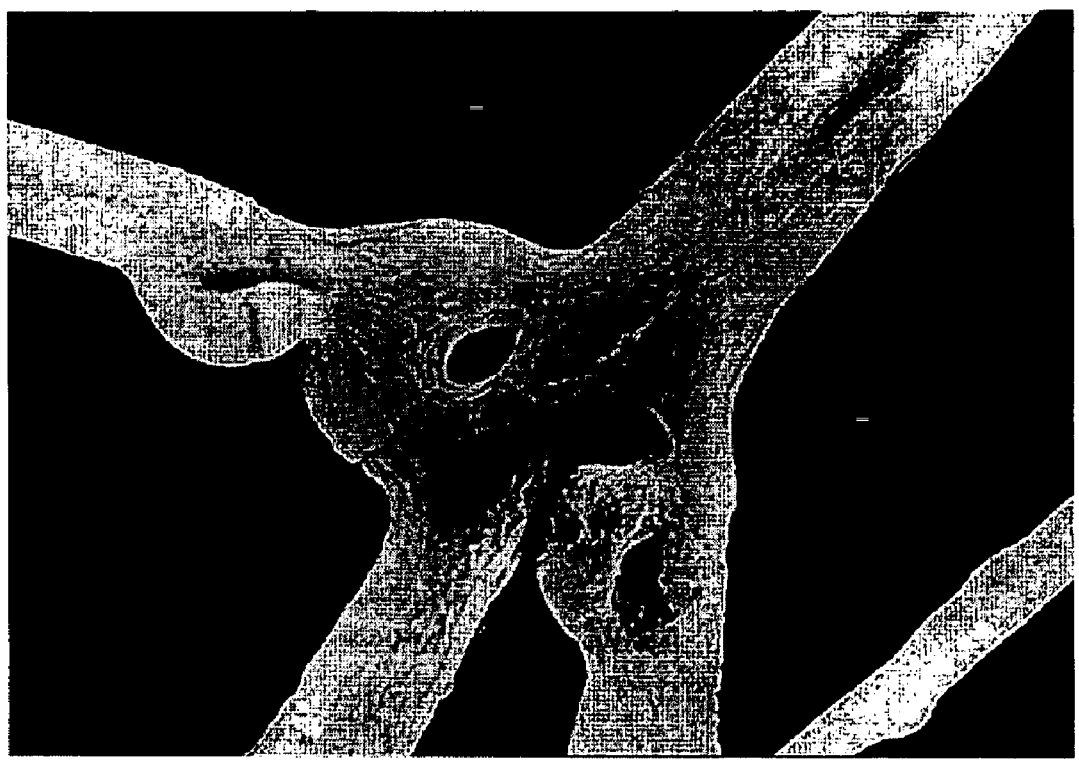
FIG. 4 shows branching hyphae of shiitake strain Ile-1 mycelium with clamp connections under Scanning Electron Microscope (SEM×3000).

Before the subculture in Petri dishes, all cultures in the tubes were examined under a light microscope. FIG. 1 shows shiitake strain Ile-1 mushrooms, white at first, becoming longitudinally linear and cottony-aerial in age, rarely, if ever truly rhizomorphic. In age, or in response to damage, the mycelium becomes dark brown. Vegetative mycelium consists of thin-walled hyphae, which are branched (FIG. 2). The diameter of the hyphae varies between 1.5 to 4 μm. Clamp connections are important characteristics of mycelia of shiitake mushrooms (FIG. 3). Clamp connections in shiitake mushroom mycelia have the classical form with a slit between the clamps and the septum (FIG. 4). Crystals are formed on the hyphae under cultivation on different nutritional media (agar and liquid media) and represent a relatively stable characteristic of culture.

For storage and transfer of subcultures of cultures of *L. edodes* strains from tube to tube or from tube to Petri dishes, malt extract agar (MEA) and wart agar (WA) media were used. Composition of MEA (pH 5.5): 37.0 g malt extract and agar, 1.0 g yeast extract, 0.5 g peptone, 0.5 g ammonium sulfate, 0.5 g magnesium sulfate, 1.0 g $KH_2PO_4$, 5.0 glucose, 1 L distilled water. Composition of WA (pH 5.0): 17.0 g agar, 0.5 g yeast extract, 0.5 g peptone, 0.5 g magnesium sulfate, 0.5 liter beer wart, 0.5 liter distilled water. The MEA and WA liquid media were transferred to tubes and flasks, autoclaved at 121° C., 15 psi for 30 min, and transferred to Petri dishes.

Tubes and Petri dishes were inoculated with a pure culture of *L. edodes* under sterile conditions. Piece of agar medium overgrown with mycelium was transferred to the center of the tubes or Petri dishes. The Petri dishes were sealed. Several tubes and Petri dishes (also sealed) that were not inoculated were placed into a thermostat along with inoculated dishes, to provide the control of purity of inoculation.

Figure 5:
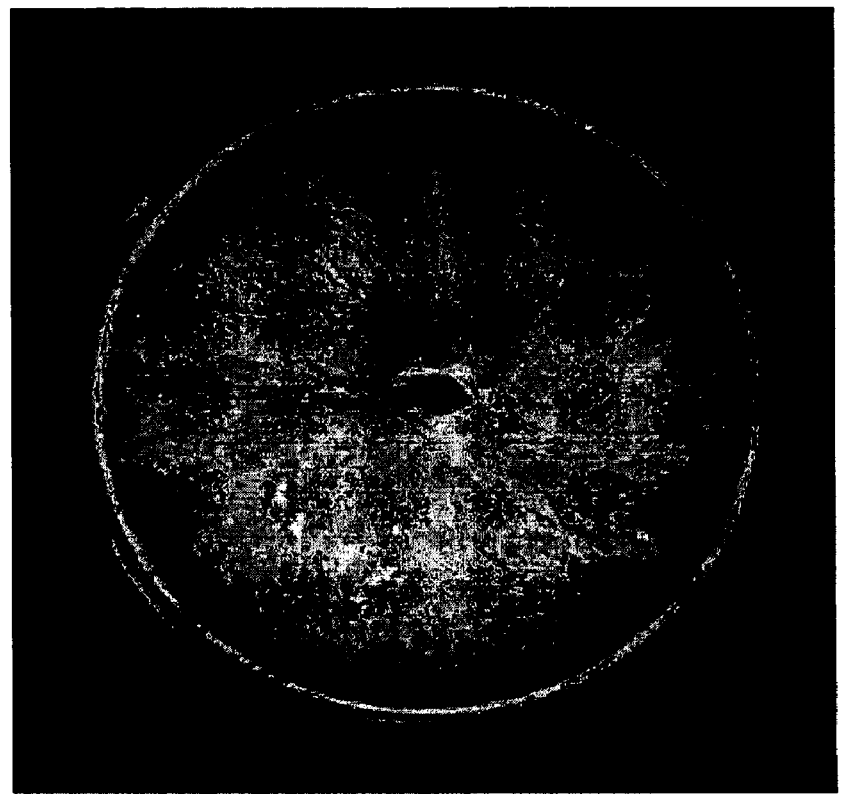
FIG. 5 shows a Petri dish ready for inoculation of the first generation grain spawn G-1 in 250 ml flasks: the marginal zone is not overgrown.

Inoculated tubes and Petri dishes were placed in darkness at 25–27° C. For further use, culture of *L. edodes* on Petri dishes should be not more than 2-weeks old, and there should be a margin of approximately 0.5 cm of uncolonized media along the inside peripheral edge (FIG. 5). In addition, the cultures should be free of contaminants of agar media such as fungi (molds) and bacteria.

EXAMPLE 2

Preparation of Grain Spawn G-1 and G-2

For the preparation of the grain spawns of the first and second generations, G-1 and G-2, respectively, wheat grain was moistened, dried, and mixed with gypsum (5–10%). Gypsum helps to keep the grain separated after sterilization and to provide calcium and sulfur, the basic elements promoting mushroom metabolism.

Erlenmeyer flasks (250/500 ml) were filled with the mixture (approximately ⅓ of the flask) and autoclaved at 121° C., 15 psi for 30 min. When the temperature of sterilized grain decreased to 25–27° C., they were inoculated by shiitake of Example 1 above. To produce grain spawn of the first generation (G-1), mycelium of shiitake on agar medium (5–10 pieces from Petri dishes) was transferred to the grain in 250 ml flasks containing each 100 ml of prepared grain, under sterile conditions. To produce grain spawn of the second generation (G-2), mycelium of shiitake on grain from the 250 ml flasks (G-1) was transferred to the grain in 500 ml flasks containing each 200–250 ml of sterile grain. All steps are carried out under sterile conditions.

Figure 6:
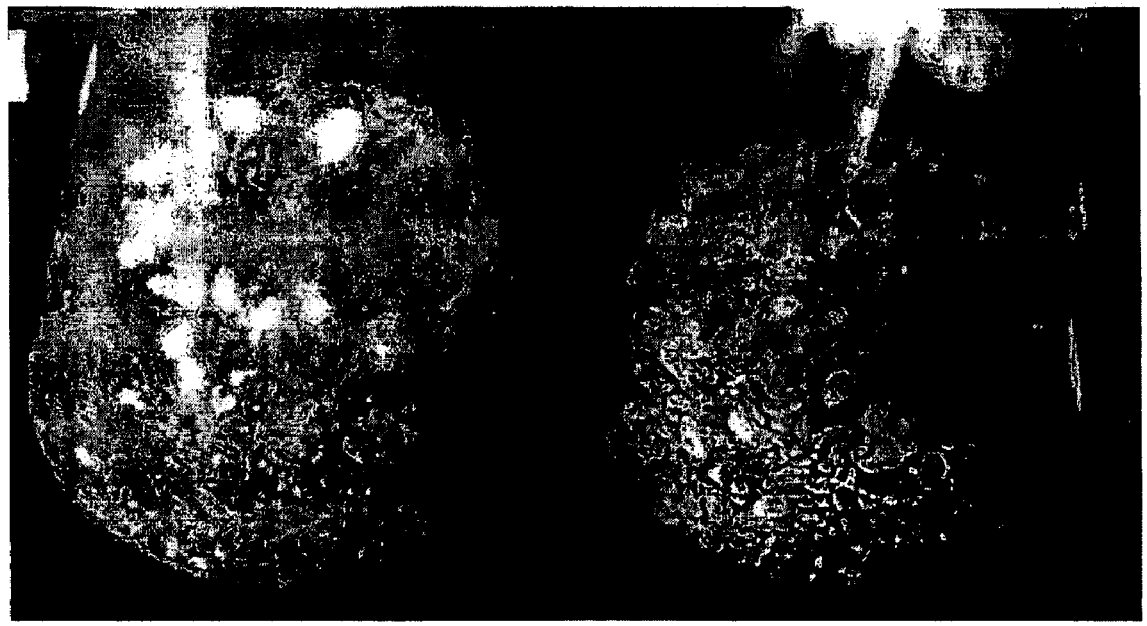
FIG. 6 shows the bottom of two 250 ml flasks containing first generation grain spawn G-1 ready for further inoculation of 500 ml flasks with sterilized grain grain spawn G-2.
Figure 7A:
FIGS. 7A–7D show plastic bags containing grain spawn.
Figure 7B:
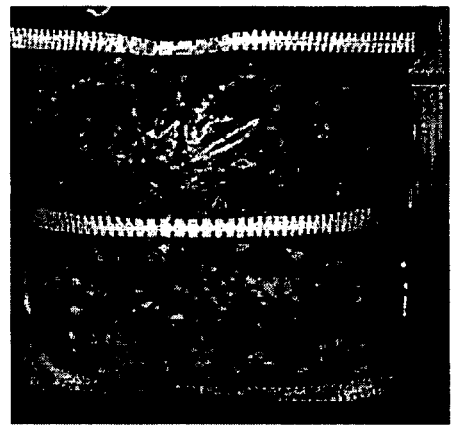
Figure 7C:
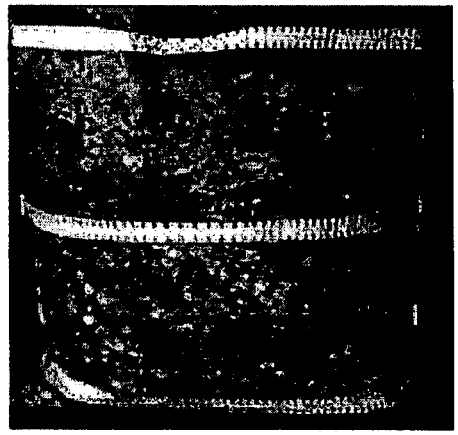
Figure 7D:
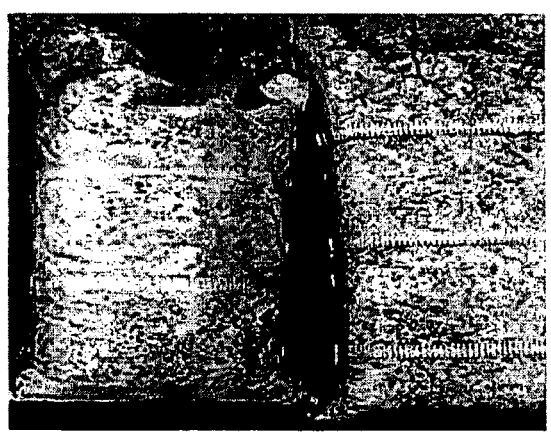

For mycelium growth, flasks (250 ml and 500 ml) with grain inoculated by shiitake were shaken to achieve an even distribution of overgrown grain, and placed in darkness at 25–27° C. After 5–7 days, the 250 ml flasks with pieces of agar medium overgrown by shiitake mycelia, were shaken again to provide equal distribution of mycelia penetrating the grain. After 10–20 days of G-1 grain spawn growth, G-2 grain spawn was ready (FIG. 6) and, after confirmation of no contamination, the second generation grain spawn G-2 was used for production of G-3 spawn in polypropylene bags.

EXAMPLE 3

Preparation of Grain Spawn G-3

For the preparation of the third generation grain spawn G-3, grain G-2 of Example 2 above was moistened, dried, and mixed with gypsum (5–10%). Approximately one-third of high-pressure polypropylene resistant bags of 550×200 mm with bactericide filters ($SACO_2$, Belgium) were filled with the grain mixture (in the part of the bag without filters). The bags were sealed by impulse sealer machine and autoclaved at 121° C., 15 psi for 30–40 min.

After sterilization, the bags with grain were left to cool down to 25–27° C., and were inoculated by shiitake of Example 1 above. The upper part of the bags were cleaned with alcohol and re-opened. Each bag containing a varying amount of grain was inoculated under sterile conditions with grain spawn G-3 in 500 ml flasks. Before transfer, the flasks were shaken well. Grain from a 500 ml flask is transferred to a plastic bag containing grain (up to approximately 5–10%). After the inoculation, the bags were sealed by impulse sealer machine and shaken well to achieve an even distribution of overgrown grain. After shaking, the grain was moved to the part of the bag with the bactericide filters.

For mycelium growth, the bags inoculated with shiitake were placed in darkness at 25–27° C. (FIG. 7). Penetration of hyphae from the grains of the grain spawn (G-2) to the sterile grain in bags was distinctly visible in several (3–5) days after inoculation. As soon as the whole substrate was colonized, the bags were transferred to the storage room or refrigerator.

When the G-3 grain spawn is prepared using 5–10% of the G-2 grain spawn, the grain in the bags are overgrown completely in 15–25 days. The time needed for complete overgrowth depends on the amount of the inoculated grain of grain spawn G-2.

EXAMPLE 4

Preparation of Sawdust Spawn G-3

For preparation of sawdust spawn G-3, sawdust was soaked in water (1–2 hours) to soften and absorb more water. Then water was poured off and gypsum was added (5–10%) and the mixture was thoroughly mixed. Approximately one-third of high-pressure resistant bags of 550×200 mm with bactericide filters ($SACO_2$, Belgium) were filled with the sawdust mixture (in the part of the bag without filters). The bags were sealed by impulse sealer machine and autoclaved at 121° C., 15 psi for 30–40 min.

After sterilization, the bags with sawdust were left to cool down to 25–27° C., and were inoculated by shiitake. The upper part of the bags were cleaned with alcohol and re-opened. Each bag containing a varying amount of sawdust was inoculated under sterile conditions with grain spawn (G-2) in 500 ml flasks. Before transferring, the flasks were shaken well. Grain from a 500 ml flask was transferred to a plastic bag containing sawdust (up to approximately 5–10%). After the inoculation, the bags were sealed by impulse sealer machine and shaken well to achieve an even distribution of overgrown grain. After shaking, the sawdust was moved to the part of the bag with the bactericide filters.

For mycelium growth, the bags inoculated with shiitake were placed in darkness at 25–27° C. (not shown). Penetration of hyphae from the grains of the grain spawn (G-2) to the sterile sawdust in bags was distinctly visible in several (3–5) days after inoculation. As soon as the whole sawdust was colonized, the bags were transferred to the storage room or refrigerator.

When the G-3 sawdust spawn is prepared using 5–10% of the G-2 grain spawn, the substrates are overgrown completely in 20–30 days. The time needed for complete overgrowth depends on the amount of the inoculated grain of grain spawn G-2.

EXAMPLE 5

Preparation of Substrate

Several substrates and their mixtures were checked in order to study mycelial growth and the formation of fruit bodies of the selected *L. edodes* strains Ile-1 and Ile-2. As substrate base components, wheat straw, sawdust (pine), peanut, almond, sunflower shells, banana leaves and grape residues were used. Olive oil waste, wheat bran, gluten meal, feather meal, sunflower meal, grape pomace, beans and alfafa (granulated) served as nutrient additives to the base components. The base components and the different additives were tested as various mixtures. Although Ile-1 and Ile-2 grew on most of the mixtures, the highest yield was obtained on substrate with wheat straw as a base component and olive oil waste as additive.

The steps of the cultivation of shiitake mushrooms in the substrate containing olive oil waste are defined in Table 1 hereinafter.

For preparation of the substrate, wheat straw was soaked in water for 12–24 h, and olive oil waste was soaked for about 1–2 hours to soften and absorb more water. After leaching, olive oil waste (30–50%) and gypsum (5–10%) were added to the wheat straw and mixed. Water was added to a degree of hydration of 60–75%. Upon mixing, humidity and pH of the substrate were checked.

High-pressure resistant polypropylene bags of 550×200 mm with bactericide filters (SACO$_2$, Belgium) were filled immediately with the resultant substrate, after mixing and wetting of the substrate, in order to avoid fermentation and contamination. The substrate is placed in the part of the bag without filters. After filling, the ends of the bags were sealed by impulse sealer machine. The bags are first loosely filled and later pressed, resulting in cylindrical bags. The bags were then sterilized by autoclaving at 121° C., 15 psi for 30–40 min. The time between mixing the components and sterilization should be less than six hours to avoid fermentation of the substrate.

Figure 8:
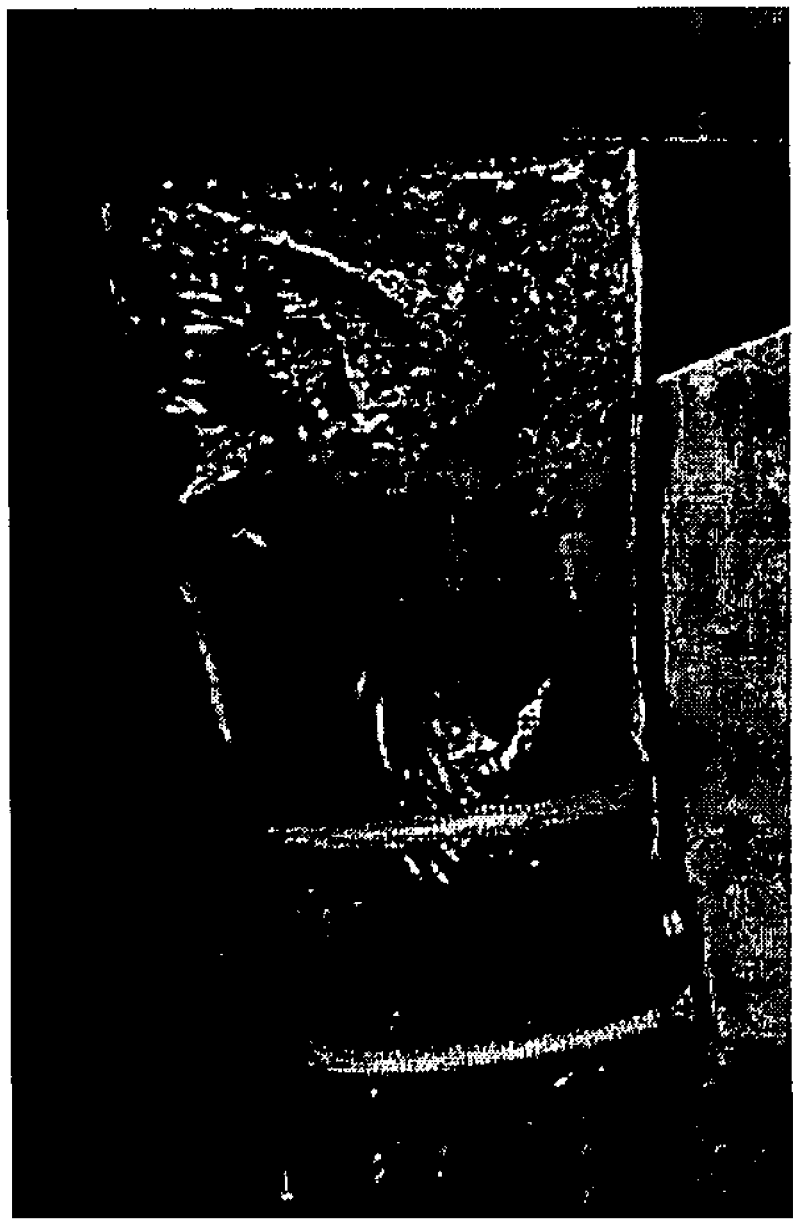
FIG. 8 shows a plastic bag containing inoculated substrate after mixing: the G-3 grain is thoroughly distributed throughout the substrate.

For the spawning stage, the bags with the sterilized substrate were left to cool down to 25–27° C. and were inoculated in a laminar hood. The upper part of each bag was cleaned with alcohol and re-opened. Each bag containing a varying amount of the substrate was inoculated under sterile conditions with 2–10% of grain G-2 and grain G-3 or sawdust G-3 shiitake spawn. The bags were inoculated by pouring grain from the flask (well shaken before) inside of the bag. After filling, the ends of the bags were sealed by impulse sealer machine and shaken. After shaking, the substrate was moved to the part of the bag with filters (FIG. 8). The more spawn is inoculated, the higher is the speed of overgrowth of a substrate.

For the spawn run stage, bags with substrate are incubated in darkness at 25–27° C. to allow colonization. After inoculation, bags are stored vertically or horizontally on shelves in a room. The temperature inside the bags must be maintained at 25–27° C., independently from the room temperature.

Different stages of the mycelial growth of *L. edodes* that can be recognized include:

a. Mycelial running—the spawn will give rise to white hyphae, overgrowing the substrate. Penetration of hyphae from the grains of inoculum to the particles of a substrate is distinctly visible in several (3–5) days after inoculation. As soon as the whole substrate is colonized, the next stage is entered.

b. Mycelial coat formation—a thick, white mycelial sheet develops on the surface of the substrate 2 to 4 weeks after inoculation.

c. Mycelial bump formation—bumps are clots of mycelium, commonly formed on the surface of a substrate. These bumps can turn into primordia at a later stage. Green moulds can easily contaminate them. Beginning of the bumping process is noted on 20–30 days of growth for strains Ile-1 and Ile-2.

d. Pigmentation stage (browning process)—some aeration should be provided when the bumps have formed. The mycelium will turn reddish-brown. If the plugs are removed entirely, however, the substrate may dry out. After 1.5–2 months, the major part of the substrate remained white and browning was noticed only in an insignificant part thereof.

Figure 9:
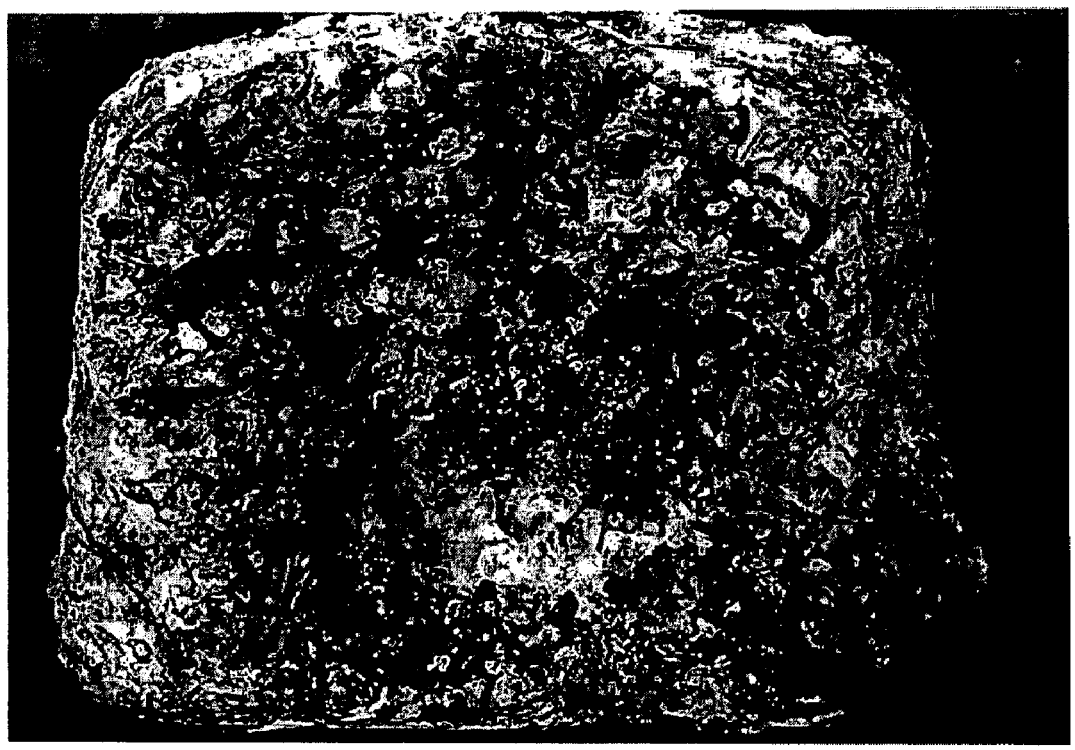
FIG. 9 shows fast substrate contamination by the fungus species of the genus *Trichoderma* at the early stages of shiitake mushroom development caused by low-quality grain spawn G-3.

During the incubation period of 1.5–2 months, contamination of the bags must be checked. Contamination by fungi, particularly green moulds species of the genus *Trichoderma*, or by bacteria, may occur due to poor sterilization of the substrate, low quality inoculation mycelia (as shown for low-quality grain spawn G-3 in FIG. 9), or by self-heating of the bags. Temperatures above 30° C. are unfavorable for shiitake mycelium growth, but allow development of other fungi, green moulds in particular. Bags contaminated by moulds must be removed from the growth chamber immediately upon discovery of contamination without being opened. Bacterial contamination is not as distinct as fungal, but can be recognized by the presence of "naked" zones not overgrown by shiitake mycelium. If less than ¼ of the substrate is affected by bacteria, a bag can be left for further spawn run. However, if by the end of the spawn run, shiitake mycelia did not penetrate the contaminated zone and did not cover it, the bag must be removed from the growth chamber.

To promote fruiting of the shiitake mushroom, the cropping conditions were changed: the bags were opened after 1.5–2 months, the plastic bags were removed from the formed blocks, and the blocks were placed into the growth chamber at temperatures of 16–18° C. and a humidity of 90%. The blocks were incubated with a 12-hour light (max. 1000 lux) and 12-hour dark cycle with fresh air exchanges.

It is noteworthy to point out that the selected shiitake strains Ile-1 and Ile-2 and substrate do not need cold shock for initiation of fruiting.

Figure 10:
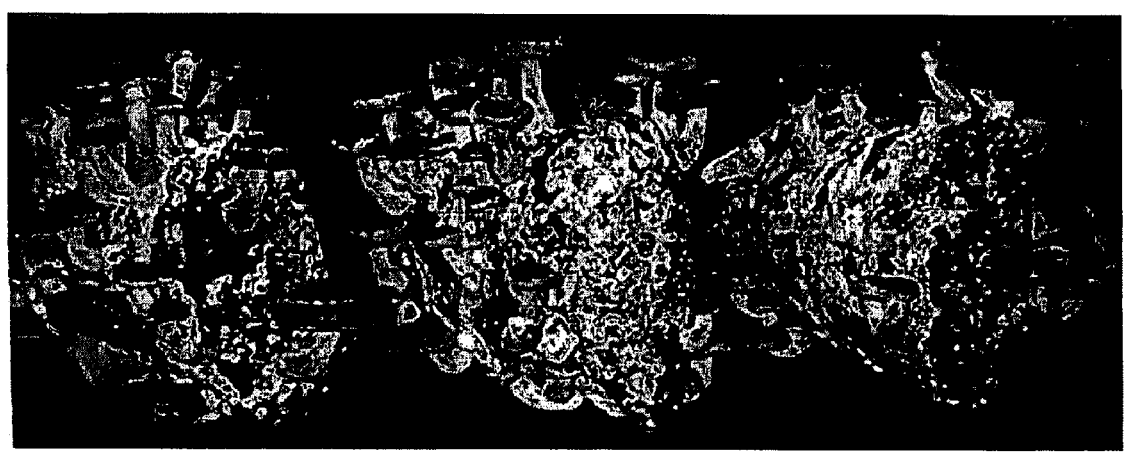
FIG. 10 shows beginning of the first flush of the shiitake mushroom strain Ile-1 at horizontally oriented blocks of the substrate of the invention.
Figure 11:
FIG. 11 shows mature fruit bodies (first flush) of the shiitake mushroom strain Ile-1 at horizontally oriented blocks of the substrate of the invention.

After 5–7 days in the growth chamber, first primordia and small fruit bodies appear throughout the surface of horizontally and vertically oriented blocks as shown in FIG. 10 (strain Ile-1). The first flush was about to begin on 10 days in the growth chamber. The yield of the first flush comprises 350–400 g of fresh fruit bodies per 1000 g of raw substrate in differently oriented blocks (see FIG. 11), first flush mature fruit bodies of strain Ile-1 at horizontally oriented blocks. On cropping, the blocks are placed into the same growth chamber.

After 7–10 days, primordia and small fruit bodies of the second flush appear. On the 13–14$^{th}$ day, the second flush is gathered, giving a yield of 40–80 g of fresh fruit bodies. By the end of the second flush, almost all of the substrate was involved in browning process.

If substrate blocks overgrown by shiitake mycelium were not contaminated during transfer to the growth chamber after removal of the plastic bags from their surface, no green mould contamination occurs on the first flush (not shown). However, some blocks may be contaminated by green moulds during the second and third flush. One of the main reasons of contamination during different flushes is placement of the blocks on different stages of fruiting—from primordia formation to the end of the second flush—in one sole growth chamber.

Several shiitake species were produced according to the method above. Mushrooms were harvested over a period of 1.5 to 2.0 months after spawning and weighed. The time required to achieve first harvest from spawning was determined.

When using a substrate composed of 57% wheat straw, 37% olive oil waste, and 6% gypsum the highest yield was obtained with Ile-1: 70 days to first harvest and yield of 400 g (from 1 kg of substrate).

It can be seen that the substrate of the invention is ideally suited for growing shiitake mushrooms of strain Ile-1 commercially on a large scale.

Strain Ile-1 is a new and distinct variety of the species *Lentinus edodes* deposited under The Budapest Treaty with the Centralbureau voor Schimmelcultures (CBS) under Accession No. CBS 11 2269.

TABLE 1

Stages of Shiitake Cultivation

| Wheat Straw | Olive oil waste | Gypsum |
|---|---|---|
| Parts | | % |
| Initial substrate components | | |
| 2 | 1 or less | 5–10 |
| Watering ingredients | | |
| 12–24 h | 1 h | — |

Mixing ingredients

Filling and sealing the bags (non-sterile conditions)
Sterilization (121° C., 15 psi, 30–40 min)

Spawning inoculation of the bags in sterile conditions with 2–10% of G-3 spawn

Spawn run

Growth on blocks in bags, 25–27° C., darkness, humidity- that of surroundings, $CO_2$- 10.000 ppm, 1.5–2 months TABLE 1-continued Stages of Shiitake Cultivation Fruiting Blocks without bags, 16–18° C., 12-hour light (1000 lux)/12-hour darkness cycle, humidity-90%, $CO_2$-1000 ppm, 1 month

What is claimed is:

1. A substrate for growth of edible and medicinal shiitake mushrooms (*Lentinus edodes*) comprising about 50–80% of wheat straw on a dry weight basis, about 20–50% by weight of olive oil waste and about 2–10% by weight of gypsum.

2. A substrate for growth of edible and medicinal shiitake mushrooms (*Lentinus edodes*) comprising about 50–70% wheat straw, about 30–50% olive oil waste and about 5–10% gypsum.

3. A substrate for growth of edible and medicinal shiitake mushrooms (*Lentinus edodes*) comprising about 50–60% wheat straw, about 30–40% olive oil waste and about 5–10% gypsum.

4. A substrate according to claim 3 comprising about 57% of wheat straw, about 37% of olive oil waste, and about 6% of gypsum.

* * * * *